United States Patent
He et al.

(10) Patent No.: US 7,844,567 B2
(45) Date of Patent: Nov. 30, 2010

(54) SYSTEM AND METHOD FOR SELECTING A TRAINING SAMPLE FROM A SAMPLE TEST BASED ON DATA SAMPLE PROXIMITY

(75) Inventors: Xiaofei He, Burbank, CA (US); Wei Vivian Zhang, Glendale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 714 days.

(21) Appl. No.: 11/837,570

(22) Filed: Aug. 13, 2007

(65) Prior Publication Data

US 2009/0049002 A1    Feb. 19, 2009

(51) Int. Cl.
    *G06F 17/00*    (2006.01)
    *G06N 7/00*     (2006.01)
    *G06N 7/08*     (2006.01)

(52) U.S. Cl. .................................................... 706/59

(58) Field of Classification Search .................... 706/59
See application file for complete search history.

(56) References Cited

PUBLICATIONS

Carlson et al. "Gene connectivity, function, and sequence conservation: predictions from modular yeast co-expression networks", BMC Genomics 2006, 7:40, pp. 1-15.*
Eisen et al. "Cluster analysis and display of genome-wide expression patterns", Proc. Natl. Acad. Sci. USA, vol. 95, pp. 14863-14868, Dec. 1998, Genetics.*
Pereira-Leal et al. "An Exponential Core in the Heart of the Yeast Protein Interaction Network", Molecular Biology and Evolution, vol. 22, No. 3, pp. 421-425.*

* cited by examiner

*Primary Examiner*—Michael B. Holmes
*Assistant Examiner*—Li-Wu Chang
(74) *Attorney, Agent, or Firm*—Seth H. Ostrow; Ostrow Kaufman LLP (57) ABSTRACT

Described are a system and method for selecting a training sample from a sample set. The method comprises determining proximities between all data samples in a set of the data samples, forming edges between the data samples as a function of the proximities, computing weights for the edges as a function of the proximities, selecting a plurality of the data samples as a function of the weights to form a subset of the data samples, and storing the subset of the data samples.

18 Claims, 5 Drawing Sheets

SYSTEM AND METHOD FOR SELECTING A TRAINING SAMPLE FROM A SAMPLE TEST BASED ON DATA SAMPLE PROXIMITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to selecting a training sample from a sample set. More specifically, the present invention relates to identifying samples within a sample set which that may most effectively train a machine learning algorithm.

BACKGROUND OF THE INVENTION

A conventional machine learning algorithm undergoes a training process by inputting known data and comparing actual output to expected output. As this process is iteratively performed, the machine learning algorithm is updated in an attempt to have the actual output match (or be within a predefined error bound of) the expected output. After the actual output matches the expected output, the machine learning algorithm may operate on unknown input data and an operator can be confident that the output generated is correct.

When using the machine learning algorithm on very large data set, the training process can be onerous. That is, an operator typically selects a training set comprising a number of samples from the data set. However, given the volume of the data set, it is entirely unrealistic to assume that every sample in the training set can be manually labeled such that when they are passed to the machine learning algorithm, correct labels are output. Additionally, arbitrary selection of the samples in the training set does not ensure that those samples are the best to train the machine learning algorithm, e.g., there is no indication that the selected samples have an objectively greater impact on the efficiency of training the machine learning algorithm.

Therefore, there exists a need for identifying a training set comprising samples of a data set that may most effectively train a machine learning algorithm.

SUMMARY OF THE INVENTION

The present invention generally relates to systems and methods for selecting a training sample from a sample set. The method may comprise determining proximities between all data samples in a set of the data samples, forming edges between the data samples as a function of the proximities, computing weights for the edges as a function of the proximities, selecting a plurality of the data samples as a function of the weights to form a subset of the data samples, and storing the subset of the data samples.

A feature vector may be generated for a given one of the data samples in the set of data samples, and the proximities may be determined as a function of the feature vector for a given one of the data samples. An adjacency graph of one or more of the data samples may be constructed by, for example, computing a proximity between a first data sample and one or more second data samples using an ε neighborhood methodology or a k-nearest-neighbor methodology. An edge between the first data sample and a selected one of the one or more second data samples may be formed when $\|x_i - x_j\|^2 < \epsilon$, wherein $\epsilon$ is a Euclidean norm in $R^n$, $x_i$ is a first feature vector for the first data sample and $x_j$ is a second feature vector for the selected one of the one or more data samples, or when the first data sample is among k nearest neighbors of the selected one of the one or more second data samples. A weight of the edge between a first data sample and a second data sample may be set equal to $e^{-(\|x_i - x_j\|^2)/t}$, wherein $x_i$ is a first feature vector for the first data sample, $x_j$ is a second feature vector for the second data sample and t is a parameter selected from a set of real numbers R. In another exemplary embodiment, the weight of an edge between a first data sample and a second data sample may be equal to one, and zero when there is no edge.

The subset of data samples may be selected by solving an optimization problem for a maximum, wherein the optimization problem is:

$$\max_{Z=(z_1,\ldots,z_k)} tr\left(X(Z^T Z + \lambda_1 X^T L X + \lambda_2 I)^{-1} X^T\right)$$

where:
X is a matrix whose columns contain feature vectors for all of the data samples;
Z is a matrix whose columns contain feature vectors for the subset of data samples;
tr( ) denotes a matrix trace operation;
I is an identity matrix;
$\lambda_1$ is a first parameter
$\lambda_2$ is a second parameter; and
L is a matrix defined as L=D−S, where S is a weight matrix including the weights and D is a diagonal matrix whose i-th entry at a diagonal is an i-th row sum of S.

The first parameter may be about 0.001, and the second parameter may be about 0.00001. Upon determining the maximum, the subset of data samples associated with the matrix Z is identified as a training set. One or more labels are assigned to a given one of the data samples in the subset. A loss function for a classification model is solved using the one or more labels to obtain a weight vector, which includes a weight for a given feature identified in the set of data samples.

A new label for a new data sample may be computed as a function of the weight vector and features associated with the new data sample. The classification model may be a regression function, and the loss function may be:

$$E(w) = \sum_{i=1}^{k} (f(z_i) - y_i)^2 + \frac{\lambda}{2} \sum_{i,j=1}^{m} (f(x_i) - f(x_j))^2 S_{ij}$$

where:
k is a number of the data samples in the subset;
$z_i$ (i=1 ... k) is an i-th data sample of the subset;
$y_i$ (i=1 ... k) is a label of $z_i$;
$x_i$ (i=1 ... m) is an i-th data sample (feature vector);
$x_j$ (j=1 ... m) is a j-th data sample (feature vector);
f is a regression function;
$\lambda$ is a regularization parameter; and
$S_{ij}$ is a weight matrix for an edge between data samples i, j.

The data samples may be one of webpages, query pairs, biometric data, face images, weather data, stock data and environmental data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
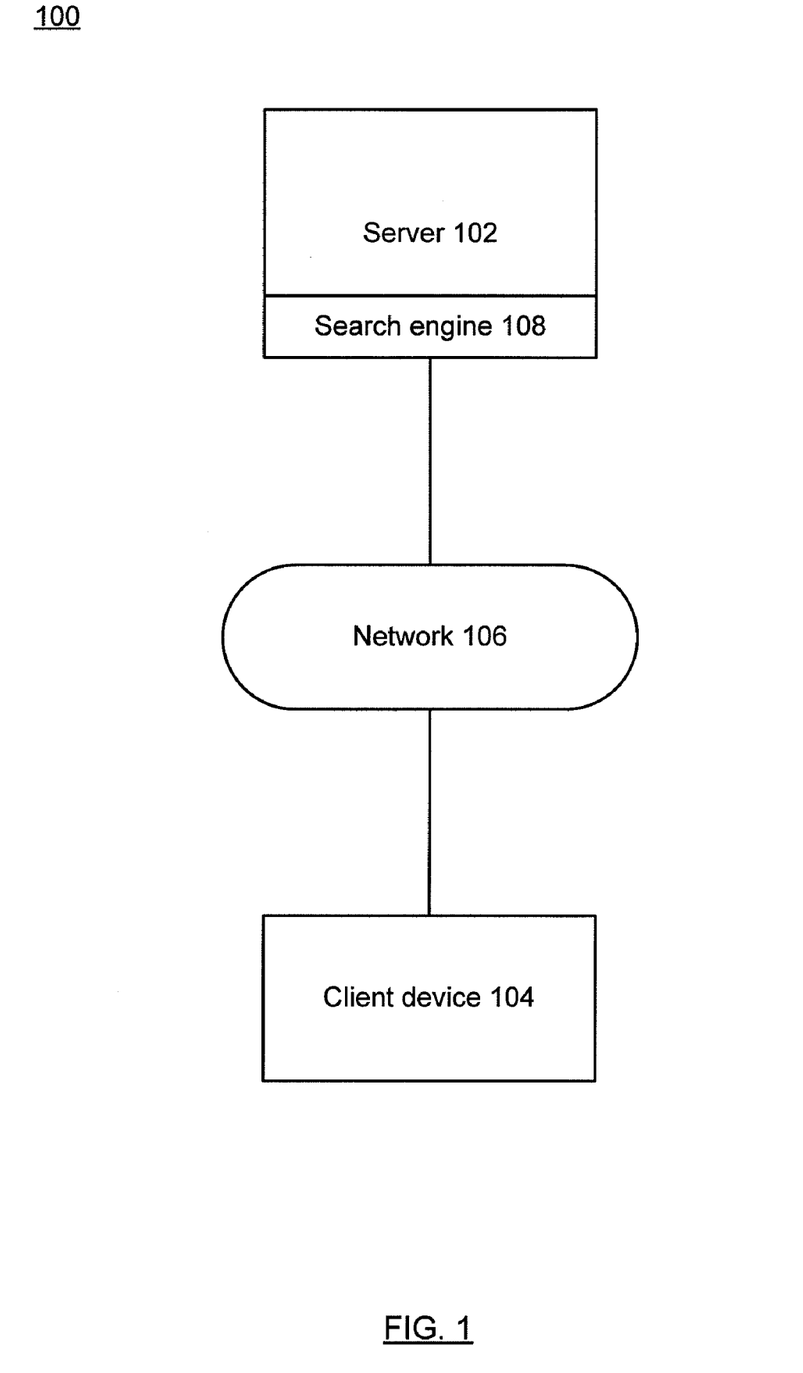
FIG. 1 shows an exemplary embodiment of a system for selecting a training sample from a sample set according to one embodiment of the present invention.

FIG. 1 shows an exemplary embodiment of a system 100 for selecting a training set from a sample set according to the present invention. The system 100 may comprise a server 102 and a client device 104 which are communicatively interconnected via a communications network 106 (e.g., a wired/wireless LAN/WAN, a cellular network, the Internet, an intranet, a VPN, a PSTN, etc.). The server 102 and the client device 104 may be processor-based computing devices which include memory and network connection ports for communicating data on the network 106. For example, the client device 104 may be a PC, laptop, mobile phone, PDA, tablet computer, handheld computer, smart appliance (e.g., scanner, copier, facsimile machine), etc. which utilizes a web browser (or command-line interface) for allowing a user to interface with devices on the network 106 and view content items (e.g., webpages, ads, videos, audio files, etc.). Those of skill in the art understand that any number of client devices 104 may be connected to the network 106 and that the server 102 may comprise any number of servers and/or databases.

In the exemplary embodiment, the server 102 may host a web search engine 108 which classifies the content items accessible over the network 106 and identifies selected content items which are responsive to queries entered by users. For example, when a user enters the query, "NY Mets®," the search engine 108 identifies the content items that are responsive to the query and returns a list of search results (e.g., in the form of hyperlinks) to those content items. Additionally, the list may be ordered by relevancy so that the content items which most likely contain information responsive to the query are listed first.

The search engine 108 may utilize a classification model to classify the content items that are accessible over the network 106. That is, in order to determine which of the content items are responsive to the query, the search engine 108 utilizes the classification model to impute a label(s) to a content item as it is discovered on the network 106. For example, when a new content item is discovered, the search engine 108 may input the new content item to the classification model to determine the label(s) that should be used to classify the new content item. The labels may be, for example, categorical descriptors (e.g., sports, news, etc.) and/or features (e.g., number of times a given word appears within the content item, etc.), which are then used by the search engine 108 to generate the list of search results.

In the above example in which the query "NY Mets" is submitted by the user, the search engine 108 identifies the labels which most closely correspond to the subject of the words in the query and generates a list of hyperlinks to the content items associated with those labels. The hyperlinks are presented to the user (via the web browser on the client device 104) in order of relevance, as determined by the labels used by the search engine 108. For example, a first search result identified in the list of search results may be a hyperlink to www.nymets.com, which is the official website of the New York Mets baseball team. Other search results may include, for example, links to sports pages of New York newspapers' webpages, a link to the Major League Baseball webpage, links to sporting goods stores' webpages, etc. These links are displayed, because the search engine 108 has determined that these webpages contain information most responsive to the user's query.

From the above example, one of skill in the art understands that the efficacy of the search engine 108 is based, primarily, on its ability to classify the content items accurately, which is a result of the output of the classification model's labels for the content items. To ensure that the labels generated by the classification model are accurate, it must be trained to identify attributes and/or features of the information within the content items which would lead to a certain label.

Additionally, due to the ever-changing status of the content items in network-based environments like the Internet, the search engine 108 must determine whether, for example, the content item is still accessible, the information in the content item has been modified, etc. Thus, the search engine 108 may comprise modules for locating and classifying the content items to provide effective and accurate network-searching capabilities.

In an exemplary embodiment of the present invention, an algorithm is used to select a set of one or more training samples, a training set, from a set of data samples. The algorithm identifies the one or more training samples as the data samples within the sample set that may most efficiently train the classification model for when it is used to classify content items. Although the exemplary embodiment may be described with reference to webpages as examples of the content items, those of skill in the art understand that the present invention may be utilized for training any predictive- and/or classification-based system or model including, for example, neural net processors and other artificial intelligence learning machines. Additionally, the classification model may be used to classify, for example, query pairs (e.g., original query, rewritten query), biometric samples (e.g., facial features), economic trends and/or stock and market analysis, weather and environmental analysis, etc.

The sample set, in the exemplary embodiment, may include millions or billions of data samples. That is, in a web search environment, when the user enters a query, the search engine 108 may return a list of millions of search results which are responsive to the query. The search results may be ranked in order of relevance by, for example, a sorting and/or ranking algorithm(s) utilized by the search engine 108 and/or tracking clicks on search results for the same or substantially the same query. For example, the search engine 108 may output an initial order of the search results based on the labels of the one or more content items. If, for example, more users are clicking on a fourth-listed search result than a first-listed search result, the search engine 108 may reorder the search results as a result of the users' clicks. In any case, the initial order of the search results may be based on the output of the classification model for one or more of the content items on the network 106.

To generate accurate search results, the classification model may be trained to classify one or more of the content items. That is, a user may manually label a content item (or a content item may be automatically labeled and manually checked for accuracy) for input to the classification model. The label output by the classification model may be compared to the manual label to determine the efficacy of the classification model. By using multiple manually labeled content items, the operation of the classification model can be adjusted, in an attempt to have it accurately classify an unlabeled content item correctly (e.g., within a predefined error bound). The exemplary embodiments of the present invention describe systems and methods for selecting the content items that may be labeled for use in training the classification model.

The exemplary embodiment of the classification model may utilize a loss function (a function that maps an event (e.g., an element of a sample space) onto a real number representing the economic cost or regret associated with the event) which is defined on all of the samples within the sample set. That is, a locality preserving regularizer may be introduced into a least-square-error based loss function to create a transformed loss function. The transformed loss function can define a classifier which is locally as smooth as possible. For example, if two points within the sample space are sufficiently close to each other, then the two points may be expected to share the same label. When the transformed loss function is defined, the samples which are the most informative may be selected for labeling. The labeled samples may then be used to train the classification model. After training, the classification model can be used on unknown and unlabeled input and the operator can be assured that the label output thereby is accurate.

Figure 2:
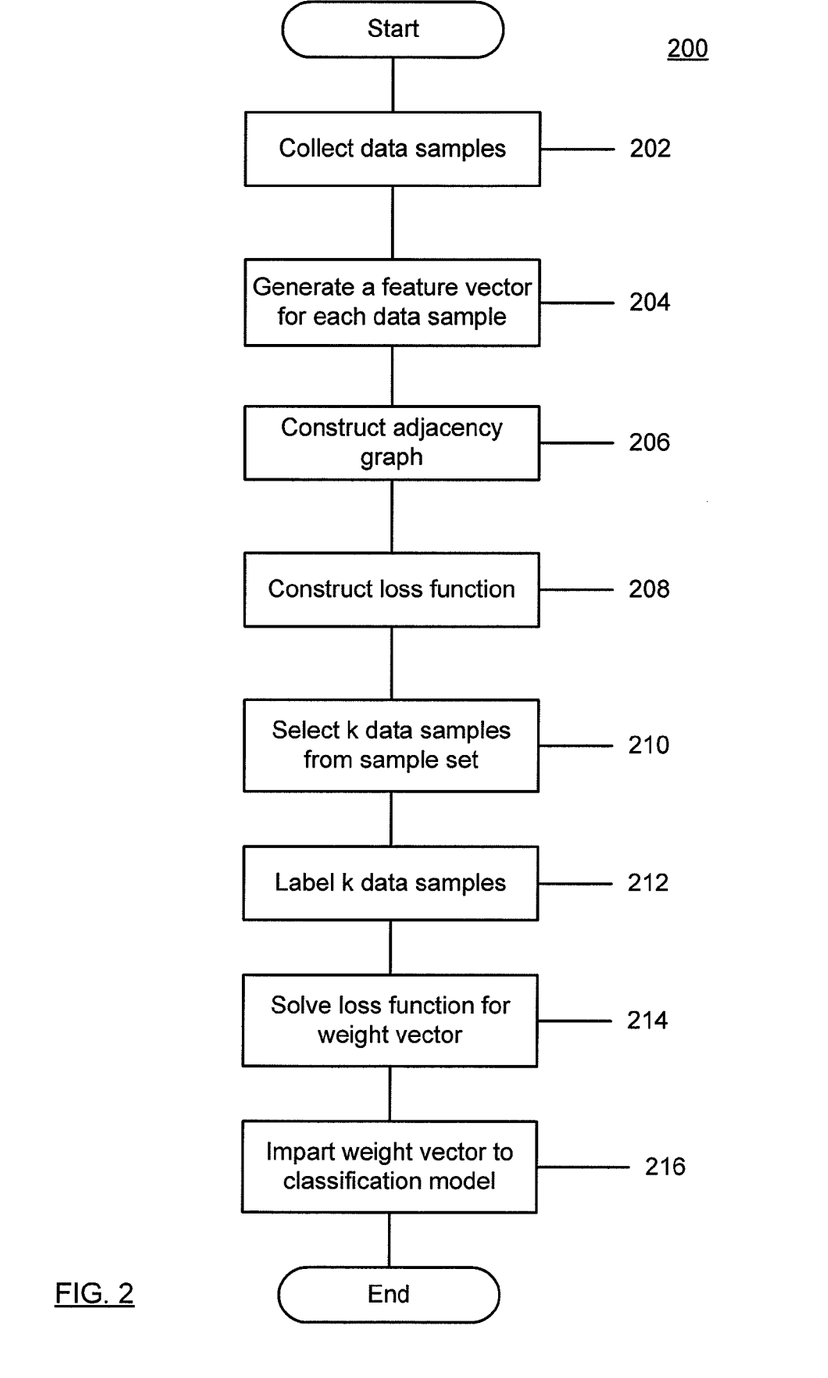
FIG. 2 shows an exemplary embodiment of a method for selecting a training sample from a sample set according to one embodiment of the present invention.

FIG. 2 shows an exemplary embodiment of a method 200 for selecting a training sample from a sample set according to the present invention. As is understood by those of skill in the art, the method 200 may be implemented in hardware or software, or any combination thereof, and in a single-processor or distributed computing environment. For example, the method 200 may be utilized offline and subsequently implemented on the server 104 to provide functionality to the search engine 108.

In step 202, data samples are collected to form a sample set. In the exemplary embodiment, the data samples are webpages. Thus, a predetermined number of webpages may be collected (offline) to form the sample set. Selection of the webpages to include in the sample set may be arbitrary. In another exemplary embodiment, the data samples may correspond to a query re-writing problem. The query re-writing problem occurs when a user inputs a query which he/she believes represents a concept for which he/she desires content items. However, due to classification and/or other query processing effects, the search results returned by the search engine 108 do not satisfy the user's request. Hence, the user rewrites the query in another attempt to retrieve the desired search results. Thus, the data sample, in this exemplary embodiment, may comprise an original query and a rewritten query. As noted above, those of skill in the art understand that the data samples may also be data items indicative of, for example, biometric features, weather or other environmental effects or events, economic trends, market analysis, stock pricing, etc. After collection, the sample set may comprise m data samples.

In step 204, a feature vector x is generated to represent one or more of the m data samples. For example, the feature vector x may comprise one or more features $x_1 \ldots x_n$ which represent characteristics of the corresponding data sample. In the exemplary embodiment in which the data sample is a webpage, the features may correspond to counts of words within the webpage. That is, a feature $x_1$ may be a number which corresponds to a number of times the word "baseball" appears within the webpage, a feature $x_2$ may be a number corresponding to a number of times the word "Mets" appears within the webpage, etc. The feature vector x may be generated automatically by parsing the data within the sample and creating a table of values, e.g., word-count pairs. Alternatively, only preselected portions of the data within the data sample may be considered when creating the feature vector x. In the example of a webpage, the features may be extracted only from, for example, data within the BODY tags.

In step 206, an adjacency graph G is constructed over all of the m data samples. The adjacency graph G may show edges between the data samples which are within a predefined distance from each other. In one exemplary embodiment, the adjacency graph G may be constructed using an ϵ-neighborhood methodology, wherein a parameter ϵ is an element of the set of real numbers, $\epsilon \in R$. In this embodiment, two selected data samples i,j may be connected by an edge if $\|x_i - x_j\|^2 < \epsilon$, wherein a norm (vector length/size) is the Euclidean norm in an n-dimensional vector space $R^n$. In a further exemplary embodiment, the adjacency graph G may be constructed using a k-nearest neighbor methodology, wherein a parameter k is an element of the set of natural numbers, $k \in N$. In this embodiment, the two selected data samples i,j may be connected by an edge if the data sample i is among the k nearest neighbors of the data sample j, or vice-versa. In any embodiment, the adjacency graph G may be constructed by iterating over all of the m data samples in the sample set.

Figure 3:
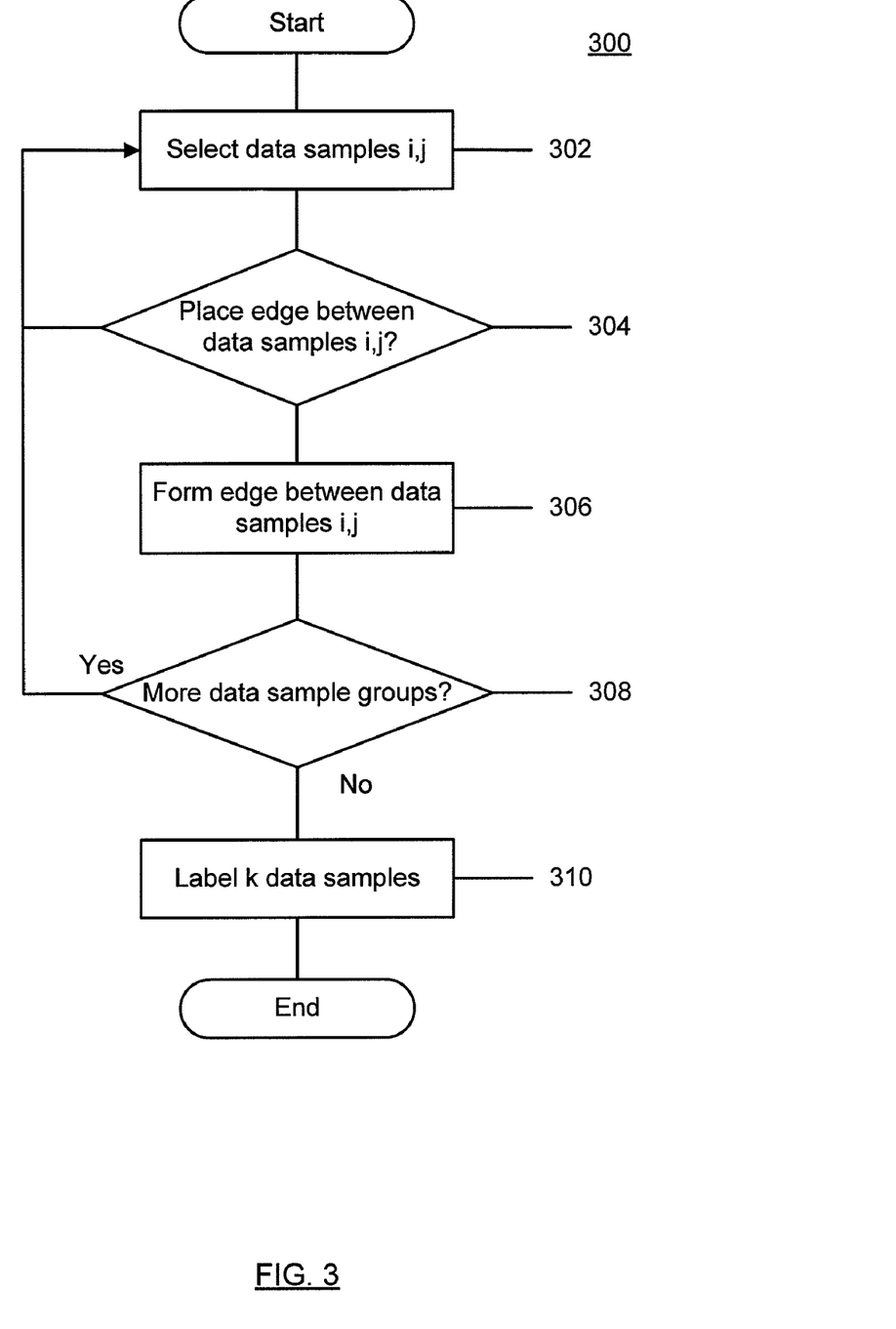
FIG. 3 shows an exemplary embodiment of a method for constructing an adjacency graph according to the present invention.

FIG. 3 shows an exemplary embodiment of a method 300 for constructing the adjacency graph G according to the present invention. In step 302, two data samples i,j are selected from the m data samples in the sample set. As understood by those of skill in the art, more than two data samples may be considered during a given iteration. In step 304, it is determined whether an edge should be constructed between the selected data samples i,j. This step may be accomplished using, for example, one of the methodologies described above or any other method/algorithm which determines proximity between data samples in an n-dimensional data space. In step 306, an edge is constructed between the selected data samples i,j, because the data samples are within a predetermined distance of each other.

In step 308, it is determined whether the selected data samples i,j are the last possible grouping two or more of data samples from within the sample set. If there are one or more remaining groupings of the data samples, the method 300 may return to step 302. In the exemplary embodiment of the present invention, the method 300 may iterate until all, or a selected number of, possible groupings of data samples have been exhausted.

As part of constructing the adjacency graph G, the edges formed between the data samples are weighted, as shown in step 310. In the exemplary embodiment, a sparse symmetric m×m weight matrix S is computed with $S_{ij}$ having a non-zero value corresponding to a weight of the edge adjoining the data samples ij, and being zero if there is no edge adjoining the data samples ij. In one exemplary embodiment, when the data samples ij are connected by an edge, the weight matrix $S_{ij}$ is computed using a heat kernel algorithm as follows:

$$S_{ij} = e^{-\frac{\|x_i - x_j\|^2}{t}}$$

where the parameter t is an element of the set of real numbers, $t \in R$. In another exemplary embodiment, a simple-minded algorithm may be utilized to compute the weight matrix S. That is, the weight matrix $S_{ij}$ equals one if and only if the data samples i,j are connected by an edge.

Referring back to FIG. 2, in step 208, a loss function is constructed. The loss function may represent a measure of fit between data (e.g., a label) generated from a mathematical model (e.g., the classification model) and the actual data (e.g., a label given to a data sample). In the exemplary embodiment, the loss function may be defined as:

$$E(w) = \sum_{i=1}^{k} (f(z_i) - y_i)^2 + \frac{\lambda}{2} \sum_{i,j=1}^{m} (f(x_i) - f(x_j))^2 S_{ij}$$

where:

k is the number of data samples that may be selected as training samples;

$z_i$ (i=1 . . . k) is the i-th data of sample $\{z_1 \ldots z_k\}$ which is a subset of $\{x_1 \ldots x_k\}$;

$y_i$ (i=1 . . . k) is the label of $z_i$;

$x_i$ (i=1 . . . m) is the i-th data sample (feature vector);

$x_j$ (=1 . . . m) is the j-th data sample (feature vector);

$f$ is the regression function; and $\lambda$ is a regularization parameter (adjustable for different applications).

As is understood from the above, the loss function may comprise a first part (e.g., a regression loss function) and a second part. A choice of the weight matrix $S_{ij}$ may incur a heavy penalty if two neighboring data samples are mapped far apart from each other. An optimal weight vector w comprising weights $w_1 \ldots w_n$ for one or more of the features $x_1 \ldots x_n$ may be obtained by minimizing a value of the loss function.

In step 210, a set of k data samples is selected from the sample set of m data samples. In the exemplary embodiment, the set of k data samples may be obtained by solving an optimization problem such as the following:

$$\max_{Z=(z_1, \ldots, z_k)} tr\left(X(Z^T Z + \lambda_1 X^T L X + \lambda_2 I)^{-1} X^T\right)$$

where:

X is a matrix whose columns contain the feature vectors x of all of the m data samples;

Z is a matrix whose columns contain the feature vectors x of the set of k data samples;

tr( ) denotes the matrix trace operation;

I is an identity matrix;

$\lambda_1$ is a first parameter (set to about, for example, 0.001);

$\lambda_2$ is a second parameter (set to about, for example, 0.00001); and

L is a matrix ("graph Laplacian") defined as L=D−S, where S is the weight matrix and D is a diagonal matrix whose i-th entry at the diagonal is the i-th row sum of S. That is, $D_{ii}=S_{i1}+S_{i2}+ \ldots +S_{im}$.

As understood by those of skill in the art, the matrix X may be unique, including the feature vectors x for all of the m data samples in the sample set. However, the matrix Z may differ by, for example, selecting a different number or ones of the m data samples to be included within the set of k data samples. The matrix Z which maximizes the optimization problem includes the k data samples that are the most informative within the sample set. Those of skill in the art further understand that selection of the set of k data samples may be performed iteratively by solving the optimization problem and comparing results until a relative maximum is obtained.

Figure 4:
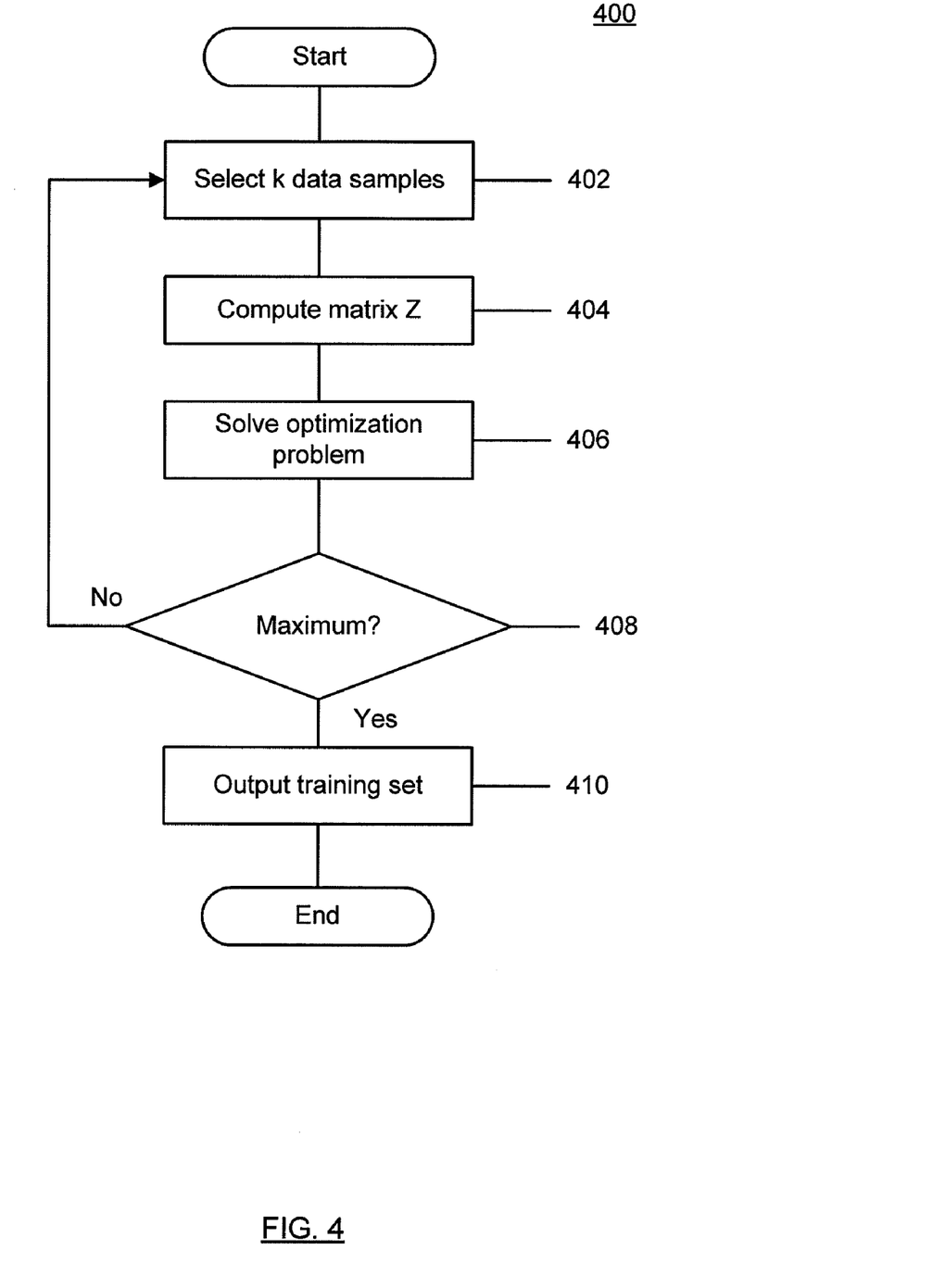
FIG. 4 shows an exemplary embodiment of a method for obtaining a training set of data samples from a sample set of data samples.

FIG. 4 shows an exemplary embodiment of a method 400 for obtaining a set of k data samples from the sample set of m data samples, whereby with the k data samples may be used to train the classification model. In step 402, a number k of data samples are selected from the sample set of m data samples. As understood by those of skill in the art, any number and/or combination of the m data samples may be selected. In step 404, the features vectors x corresponding to the k data samples that are used to generate the matrix Z. In step 406, the optimization problem is solved for a value using the generated matrix Z.

In step 408, it is determined whether the value from solving the optimization problem is a maximum. That is, the method 400 may iterate (e.g., a predetermined number of times or until all possible combinations of data samples have been utilized) to identify the k data samples which are associated with a matrix Z that maximizes the optimization problem. In this manner, the computer or other processor-based system implementing the method 400 may compare a current value for the optimization problem to all other values generated from previous iterations. Alternatively, a single value may be stored as a current maximum and updated when the current value is greater. In step 410, the k data samples which maximize the optimization problem are output and identified as a training set z having feature vectors $z_1 \ldots z_k$.

Referring back to FIG. 2, in step 212, the k data samples in the training set z are labeled. In the exemplary embodiment, one or more of the k data samples may be selected and reviewed by a member of an editorial team so that a label y may be applied thereto. For example, when the data samples are webpages, the labels may be topical descriptors, such as "entertainment," "sports," "news," etc., which correspond to a numerical value, e.g., entertainment=1. As understood by those of skill in the art, more than one of the labels y may be associated with a given data sample.

In step 214, the labels y associated with the k data samples are used to solve the loss function. As understood by those of skill in the art, solving the loss function may yield a weight vector w having weights $w_1 \ldots w_n$ associated with one or more of the features $x_1 \ldots x_n$. The weight vector w is utilized by the classification model (step 216), which may be used to determine a label for new data samples. As understood by those of skill in the art, the method 200 may be performed on a scheduled basis (e.g., at a predetermined interval, date, time, etc.), asynchronously or be event-drive (e.g., after a predetermined number of queries to the search engine 108).

Figure 5:
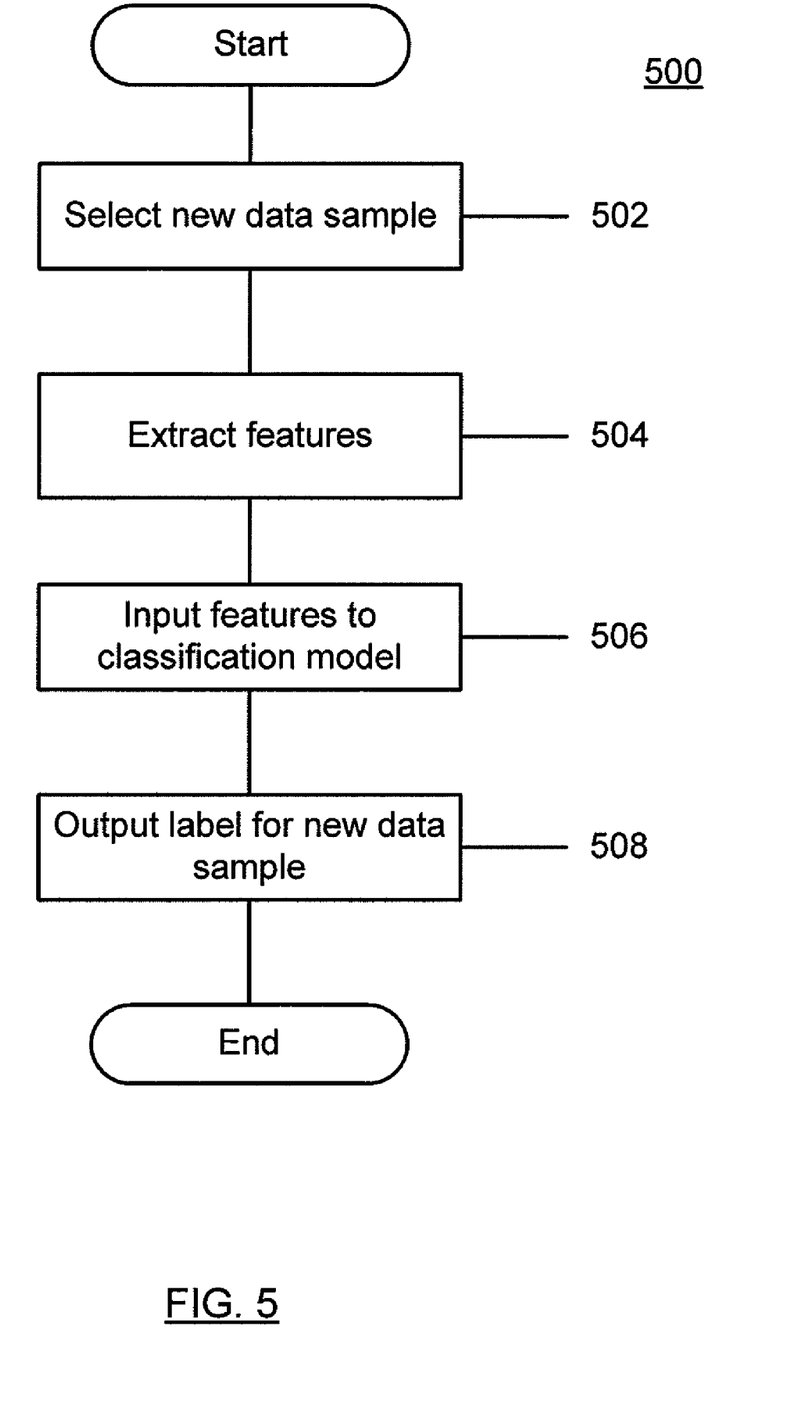
FIG. 5 shows an exemplary embodiment of a method for determining a label for a data sample using a trained classification model.

FIG. 5 shows an exemplary embodiment of a method 500 for determining a label for a new data sample using the weight vector w and the classification model. In the exemplary embodiment, the method 500 may be described with reference to a web search modality, e.g., classifying content items on the Internet so as to respond to a query with responsive content items. As understood by those of skill in the art, the method 500 may be utilized in other predictive- and/or classification-based systems.

In step 502, a new data sample is selected. For example, a web crawler or spider may have identified a new webpage, or the new webpage may have been registered on the World Wide Web and identified to the search engine 108. In step 504, the features of the new data sample are extracted. As noted above, feature extraction may include computing word counts for one or more words within the webpage or selected portions thereof. For example, if the webpage is the homepage of the New York Mets®, the words "baseball," "team," and "New York" may appear several times within the webpage. As such, a vector may be created indicating the words appearing within the webpage and the number of times a given one of the words appears in the webpage.

In step 506, the vector for the webpage is input into the classification model. The classification model, using the weight vector w, determines a label for the webpage. The words within a webpage may have varying influence when determining the label for the webpage. For example, the word "baseball" may have a stronger influence on the label than the word "New York." Additionally, use of a given word multiple times in the webpages may also influence the label for the webpage. That is, the more times that the word "baseball" appears in the webpage, the more likely that the webpage has a label associated with the "sports" category.

In step 508, the classification model outputs the label for the new webpage. An identifier (e.g., URL address) corresponding to the webpage may be stored in an index with the label corresponding thereto. An operation may then be performed (e.g., sorting, ranking) on the index or a selected portion thereof. As understood by those of skill in the art, the method 500 may be performed on a real-time basis, classifying a new content item and indexing the new content item for search purposes.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method, comprising:
determining proximities between all data samples in a set of the data samples;
forming edges between the data samples as a function of the proximities;
computing weights for the edges as a function of the proximities;
selecting a plurality of the data samples as a function of the weights to form a subset of the data samples by solving an optimization problem, $$\max_{Z=(z_1,\ldots,z_k)} tr\left(X(Z^T Z + \lambda_1 X^T L X + \lambda_2 I)^{-1} X^T\right)$$

for a maximum where X is a matrix whose columns contain feature vectors for all of the data samples, Z is a matrix whose columns contain feature vectors for the subset of data samples, tr( ) denotes a matrix trace operation, I is an identity matrix, $\lambda_1$ is a first parameter, $\lambda_2$ is a second parameter, and L is a matrix defined as L=D−S, where S is a weight matrix including the weights and D is a diagonal matrix whose i-th entry at a diagonal is an i-th row sum of S; and storing the subset of the data samples.

2. The method according to claim 1, further comprising:
generating a feature vector for each of the data samples in the set of data samples; and
determining the proximities as a function of the feature vector for each of the data samples.

3. The method according to claim 1, wherein the determining includes:
constructing an adjacency graph of all of the data samples.

4. The method according to claim 3, wherein the constructing includes:
computing a proximity between a first data sample and one or more second data samples using an $\epsilon$ neighborhood methodology.

5. The method according to claim 4, wherein the computing includes:
forming an edge between the first data sample and a selected one of the one or more second data samples when $\|x_i - x_j\|^2 < \epsilon$, wherein $\epsilon$ is a Euclidean norm in $R^n$, $x_i$ is a first feature vector for the first data sample and $x_j$ is a second feature for the selected one of the one or more data samples.

6. The method according to claim 3, wherein the constructing includes:
computing a proximity between a first data sample and one or more second data samples using a k-nearest-neighbor methodology.

7. The method according to claim 6, wherein the constructing includes:
forming an edge between the first data sample and a selected one of the one or more second data samples when the first data sample is among k nearest neighbors of the selected one of the one or more second data samples.

8. The method according to claim 1, wherein the computing weights includes:
setting a weight of an edge between a first data sample and a second data sample equal to $e^{-(\|xi-yj\|^2)/t}$, wherein $x_i$ is a first feature vector for the first data sample, $x_j$ is a second feature for the second data sample and t is a parameter selected from a set of real numbers R.

9. The method according to claim 1, wherein the computing weights includes:
setting a weight of an edge between a first data sample and a second data sample equal to one.

10. The method according to claim 1, wherein the first parameter is about 0.001 and the second parameter is about 0.00001.

11. The method according to claim 1, further comprising:
upon determining the maximum, identifying the subset of data samples associated with the matrix Z.

12. The method according to claim 1, further comprising:
assigning one or more labels to each of the data samples in the subset.

13. The method according to claim 12, further comprising:
solving a loss function for a classification model using the one or more labels to obtain a weight vector.

14. The method according to claim 13, wherein the weight vector includes a weight for each feature identified in the set of data samples.

15. The method according to claim 13, further comprising:
computing a new label for a new data sample as a function of the weight vector and features associated with the new data sample.

16. The method according to claim 13, wherein the classification model is a regression function.

17. The method according to claim 13, wherein the loss function is $$E(w) = \sum_{i=1}^{k} (f(z_i) - y_i)^2 + \frac{\lambda}{2} \sum_{i,j=1}^{m} (f(x_i) - f(x_j))^2 S_{ij}$$

where:
k is a number of the data samples in the subset;
$z_i$(i=1 ... k) is an i-th data sample of the subset;
$y_i$(i=1 ... k) is a label of $z_i$;
$x_i$(i=1 ... m) is an i-th data sample (feature vector);
$x_j$(j=1 ... m) is a j-th data sample (feature vector);
f is a regression function;
$\lambda$ is a regularization parameter; and
$S_{ij}$ is a weight matrix for an edge between data samples i,j.

18. The method according to claim 1, wherein the data samples are one of webpages, query pairs, biometric data, face images, weather data, stock data and environmental data.

* * * * *